United States Patent [19]
Pearman et al.

[11] Patent Number: 5,194,958
[45] Date of Patent: Mar. 16, 1993

[54] MOVIE FILM TO VIDEO CONVERSION WITH CORRECTION OF FRAME MISALIGNMENT

[75] Inventors: James B. Pearman; John Galt, both of Glendale, Calif.; Yoshio Ozaki, Tokyo, Japan

[73] Assignee: Sony Broadcast & Communications Limited, Basingstoke, England

[21] Appl. No.: 733,875

[22] Filed: Jul. 22, 1991

[30] Foreign Application Priority Data

Aug. 31, 1990 [GB] United Kingdom ............... 9019004

[51] Int. Cl.⁵ .............................................. H04N 5/253
[52] U.S. Cl. ..................................... 358/214; 358/209; 358/54
[58] Field of Search ............... 358/214, 215, 53, 54, 358/140, 11, 209

[56] References Cited

U.S. PATENT DOCUMENTS

| | | | |
|---|---|---|---|
| 4,296,438 | 10/1981 | Stemme et al. | 358/214 |
| 4,823,204 | 4/1989 | Holland | 358/347 |
| 4,855,836 | 8/1989 | Shearer | 358/214 |
| 4,875,102 | 10/1989 | Poetsch | 358/214 |
| 4,903,131 | 2/1990 | Lingemann et al. | 358/214 |
| 4,989,077 | 1/1991 | Yamamoto | 358/76 |

FOREIGN PATENT DOCUMENTS

| | | |
|---|---|---|
| 3736789 | 10/1987 | Fed. Rep. of Germany . |
| 1-291581 | 11/1989 | Japan . |
| 2-7778 | 1/1990 | Japan . |
| 2-241277 | 9/1990 | Japan . |
| 2145899 | 4/1985 | United Kingdom . |
| 2212024 | 7/1989 | United Kingdom . |
| 2212025 | 7/1989 | United Kingdom . |

*Primary Examiner*—Herbert Goldstein
*Assistant Examiner*—Tuan V. Ho
*Attorney, Agent, or Firm*—Alvin Sinderbrand; William S. Frommer

[57] ABSTRACT

Apparatus for photographic movie film to video signal conversion comprises a movie film to video conversion apparatus such as a telecine (11) in which the film (1) is aligned frame by frame to derive a video signal, and a video signal processor (16), such as a digital video effects apparatus (12), to process the derived video signal by reference to registration features (2) of the film (1), such as L-shaped registration marks (2) exposed thereon adjacent to each frame (3) of the film (1), to obtain more accurate frame alignment of the video signal.

15 Claims, 4 Drawing Sheets

FIG.1
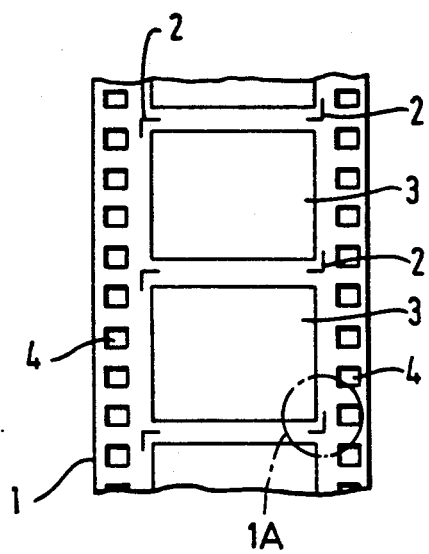
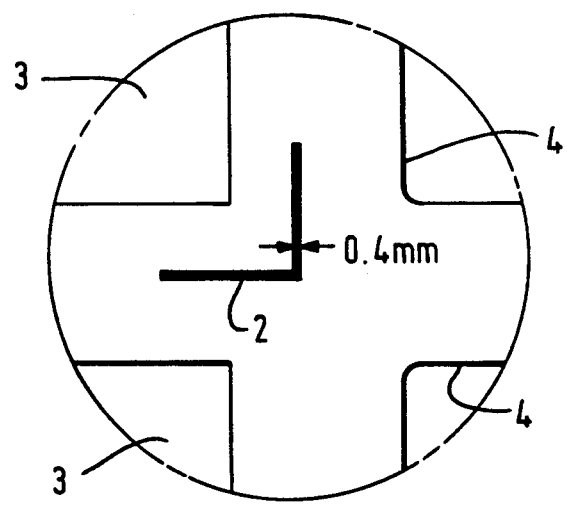
FIG.1A

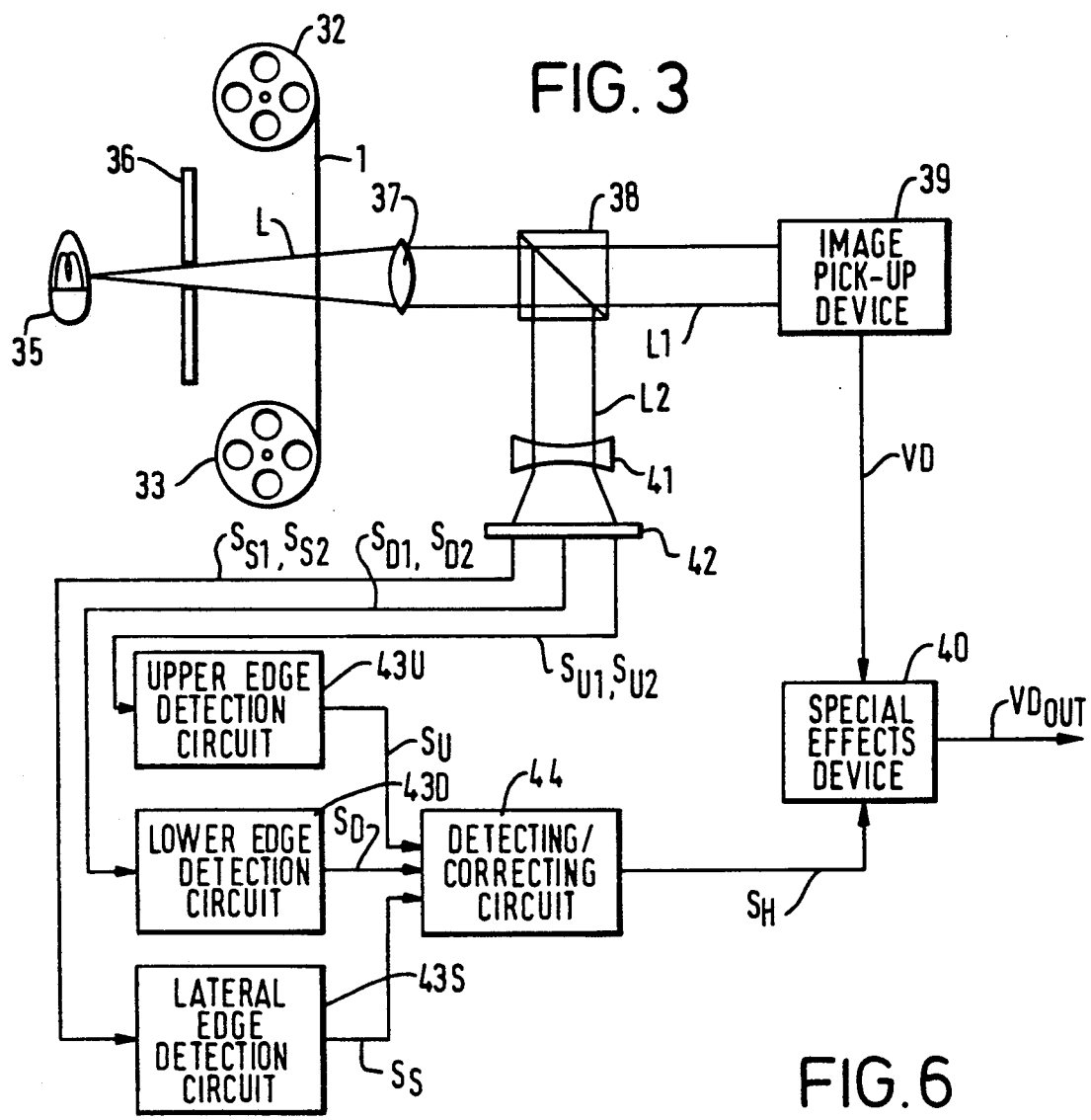
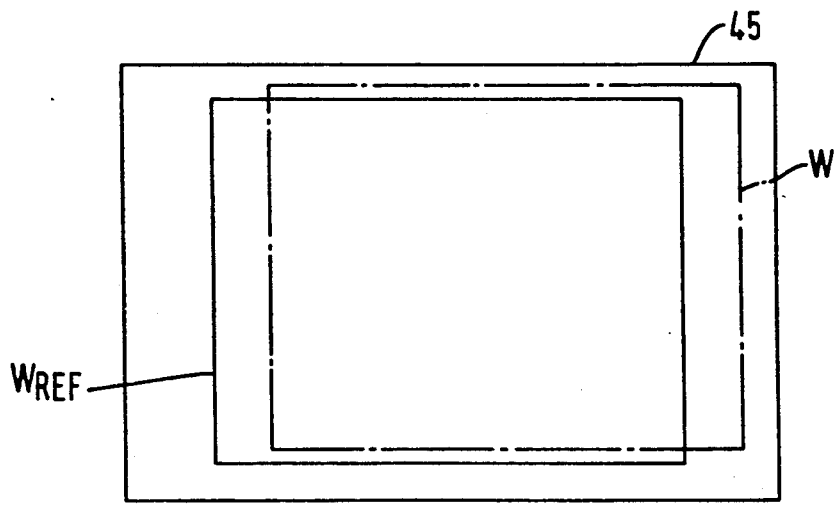

MOVIE FILM TO VIDEO CONVERSION WITH CORRECTION OF FRAME MISALIGNMENT

BACKGROUND OF THE INVENTION

1. Field of the Invention

This invention relates to methods of and apparatus for photographic movie film to electronic video signal conversion, and to movie cameras particularly, but not exclusively, suitable for use in association with such conversion.

2. Description of the Prior Art

When a photographic movie film is converted to a video signal in a telecine, each frame of the film must be mechanically positioned so as to be aligned in the same position as the previous frames, to enable an accurately framed video signal to be derived. Hitherto, this has been done by pin registration, wherein an interference fit, slightly tapered pin is fitted into the film sprocket holes. Due to mechanical inaccuracies, this pin registration method does not give perfect results, and in consequence there may be an irritating lack of steadiness (so-called weave) in the image reproduced from the video signal. There are, moreover, other problems with this pin registration method. In particular, due to mechanical limitations, the conversion cannot be performed in real time, and typically the transport speed is as low as two frames per second. Also, there is a risk of damage to the sprocket holes by the tightly fitting pin. There is also the associated problem that movie cameras are noisy in operation due to the operation of the mechanism which meshes with the film sprocket holes to advance the film.

SUMMARY OF THE INVENTION

One object of the present invention is to provide a method of a photographic movie film to video signal conversion in which the above problems are overcome.

Another object of the present invention is to provide apparatus for photographic movie film to video signal conversion in which the above problems are overcome.

Another object of the present invention is to provide a movie camera capable of using photographic film without sprocket holes.

According to the present invention there is provided a method of forming a video signal from a film having a plurality of frames, the method comprising the steps of forming respective registration marks on the film in areas adjacent to each of the frames, in which each of the registration marks includes a line extending in a substantially horizontal direction and a line extending in a substantially vertical direction; generating the video signal from the film on a frame by frame basis; deriving error signals representative of respective differences between actual positions of the registration marks associated with each of the frames and the positions the registration marks would have had if the frame currently being viewed was properly aligned; and correcting the video signal in accordance with the error signals.

According to the present invention there is also provided a method of forming a video signal having a plurality of pixels representing a video image from a film having a plurality of frames with respective registration features associated therewith, the method comprising the steps of generating the video signal from the film on a frame-by-frame basis; detecting misalignment between the respective registration features associated with each of the frames and reference features; deriving error signals in accordance with the detected misalignment between the respective registration features and the reference features; and processing the video signal in accordance with the error signals so as to produce a corrected video signal in which the image has been manipulated by at least one of rotating the image and moving the image in horizontal and vertical directions with sub-pixel accuracy.

According to the present invention there is also provided apparatus for forming a video signal having a plurality of pixels representing a video image from a film having a plurality of frames, the apparatus comprising: film to video signal conversion means for generating the video signal from the film on a frame-by-frame basis; detection means for detecting misalignment between at least one respective registration feature associated with each of the frames and reference features and for generating error signals in accordance with the misalignment; and digital video effects means for processing the video signal in accordance with the error signals so as to produce a corrected video signal in which the image has been manipulated by at least one of rotating the image and moving the image in horizontal and vertical directions with sub-pixel accuracy.

Said registration marks or registration features may be L-shaped registration marks exposed on said frame respectively adjacent to two diagonally opposite corners of each frame thereof, and the positions of said registration marks may be read by a charge coupled device sensor.

According to the present invention there is also provided a movie camera using photographic film not having sprocket holes.

The above, and other objects, features and advantages of this invention will be apparent from the following detailed description of illustrative embodiments which is to be read in conjunction with the accompanying drawings.

BRIEF DESCRIPTION OF THE DRAWINGS

FIG. 1 shows a short length of photographic movie film, a small portion thereof being shown substantially enlarged;

FIGS. 2 and 3 show in block diagrammatic form first and second embodiments respectively of apparatus for photographic movie film to video signal conversion according to the present invention;

FIG. 6 shows diagrammatically frame registration in a third embodiment.

DESCRIPTION OF THE PREFERRED EMBODIMENTS

Figure 2:
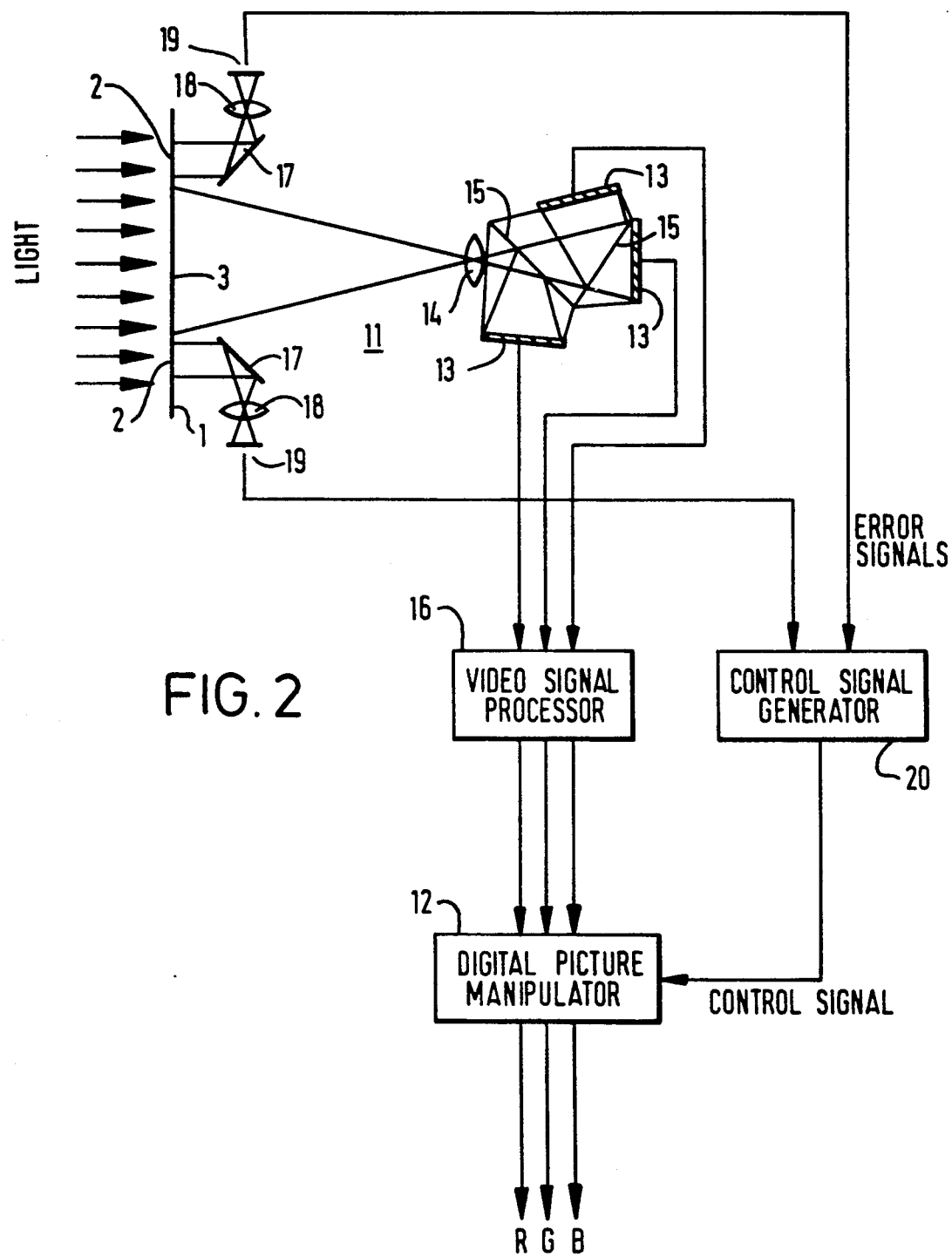

Referring to FIGS. 1 and 2, the first embodiment to be described is for the conversion of 35 mm photographic movie film 1 to a high definition video signal, but it will be understood that the invention can be applied to the conversion of other sized movie films to other video signals. Briefly, the film 1 is passed through a modified form of telecine 11 to derive a video signal. The film 1 has thereon registration marks 2 associated with each frame 3, and the telecine 11 is modified to derive error signals from which are derived a control signal which is supplied together with the derived video signal to a digital picture manipulator 12 which operates to enhance the framing of the video signal, and so correct for any inaccuracy in the framing of the film 1 in the telecine 11. The appartus thus avoids the problems mentioned above in connection with the pin registration method of framing, and in particular permits relatively high speed operation, if necessary up to or even beyond real time operation.

Referring more specifically to FIG. 1, the film 1 has sprocket holes 4, and the registration marks 2 are preferably in the form of two similar L-shaped marks associated respectively with diagonally opposite corners of each frame 3, and positioned as shown in the space between the frame 3 and the adjacent sprocket holes 4. As indicated in the enlarged portion of the figure, the width of each limb of each registration mark 2 may be 0.4 mm.

The respective registration marks 2 are very accurately aligned in position and orientation relative to each frame 3, and to achieve this they are preferably exposed on the film 1 in the camera, as the film 1 is shot. Alternatively, they may be exposed on the film 1 subsequently, but still prior to processing of the film 1, for example by reference to the positions of the sprocket holes 4, or they may be printed on the film 1 subsequent to processing, again by reference to the positions of the sprocket holes 4. These latter two alternatives are not preferred, due to the greater difficulty of obtaining accurate alignment of the registration marks 2 relative to the frames 3, but nonetheless they do have utility, in particular in the case of preexisting films 1 where the decision to provide registration marks 2 has not been made until subsequent to shooting.

In all cases the registration marks 2 contrast with the transparency or opacity of the areas of the film 1 where they are provided, so as to be optically readable. Thus, for example, if the film base is clear, the registration marks can be black, and vice versa.

Referring more specifically to FIG. 2, the first embodiment comprises the telecine 11 which incorporates means, not shown, to hold the film 1 and advance it substantially exactly frame by frame by engagement with the sprocket holes 4. No mechanism as used in the pin registration method referred to above, is provided. As each frame 3 is brought into position, parallel light from a source (not shown) is caused to fall on the frame 3, so that images thereof are formed on three charge coupled device sensors 13 of the telecine 11 by a lens system 14 and dichroic mirrors 15, in known manner. From the charge coupled device sensors 13 are derived red (R), green (G) and blue (B) video signals, again in known manner, which are supplied to a video signal processor 16 for any necessary processing.

Additionally, the light falling on the film 1 falls on two angled mirrors 17 located to correspond in position with the two registration marks 2 respectively associated with the frame 3 currently being imaged. The reflected light passes through respective objective lenses 18, which may be ×50 magnification lenses, and falls on respective charge coupled device sensors 19 which derive respective error signals representative of the divergence of the respective registration marks 2 from the positions they would occupy if the frame 2 currently being imaged were precisely located at the required aligned position.

These two error signals are supplied to a control signal generator 20 which derives therefrom a single control signal (or if required by the subsequent circuitry, a group of control signals) representative of the translational movement in the horizontal and in the vertical direction of the image represented by the video signals derived by the telecine 11, and of the rotational movement of said image, which are together required to bring said image to the exact position which it would occupy if the film 1 were positioned such that the frame currently being imaged were in the precisely required position. To achieve this accurately, the charge coupled device sensors 19 may, for example, sense the positions of the outer edges of the two limbs of each registration mark 2.

This control signal and the three video signals from the video signal processor 16 are supplied to the digital picture manipulator 12. The three video signals may be derived in digital form by the telecine 11, or they may be derived in analogue form and be converted to digital form by the video signal processor 16. The digital picture manipulator 12 is conveniently in the form of a digital video effects apparatus of known form, the essential requirements being that it can manipulate the video signals so as to have the effect of translationally moving the corresponding image in the horizontal and the vertical directions, preferably with sub-pixel accuracy, and of rotating the corresponding image, so enhancing the frame alignment of the video signals, which are then supplied for further processing as required, such further processing not being of relevance to the present invention.

The effect is therefore to correct for any minor inaccuracy in the positioning of the film 1 relative to the position it should occupy for each frame 3 thereof to be aligned in precisely the same position when it is being imaged. In this way 'weave' in the reproduced image can be eliminated. Moreover, as the positions of the registration marks 2 are read opto-electronically by the charge coupled device sensors 19, the apparatus can be operated at relatively high speed, as no mechanical means is required to achieve the exact positioning of each frame 3 of the film 1.

Referring now to FIG. 3, the second embodiment to be described is likewise for the conversion of 35 mm photographic movie film 1 to a high definition video signal.

The film 1 is continuously advanced from a feed reel 32 to a take-up reel 33 by a film advancing mechanism. A light beam L projected from a light source 35 is adjusted by an aperture 36 and is then projected on the film 1. A transmitted light beam L1 which has passed through the film 1 is incident on an image pick-up device 39 through a projection lens 37 and a beam splitter 38. The light beam L1 is converted to a video signal VD in the image pick-up device 39, and the video signal VD is supplied to a special effects device 40 such as a digital picture manipulator. In the special effects device 40, the video signal VD is subjected to interpolation processing to correct the framing and is then supplied as an output video signal $VD_{OUT}$.

The beam splitter 38 deflects a vertically polarized component of the light beam L1 as a polarized light beam L2 to an edge sensor 42 through a concave lens 41 to form an erect image of the light beam L1 on the edge sensor 42. The concave lens 41 enhances the misregistration detection accuracy of the edge sensor 42 by diverging the incident polarized light beam L2.

Figure 4:
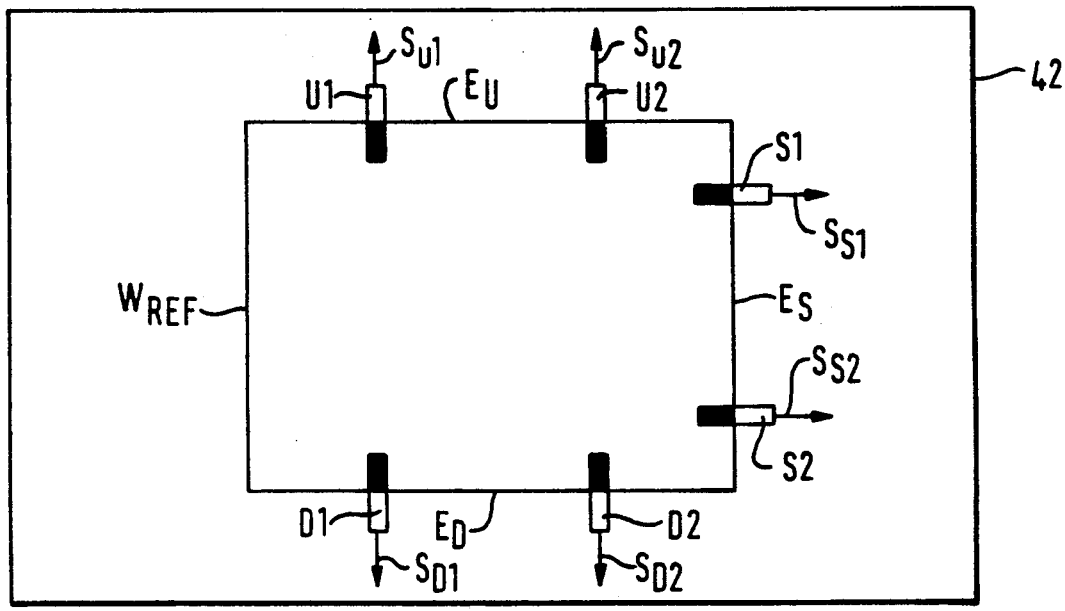
FIG. 4 shows diagrammatically the position of a reference frame relative to line sensors.

When in this embodiment, a projected picture is formed without any misregistration as shown in FIG. 4, the polarized light beam L2 is projected to a reference position on the surface of the edge sensor 42, so that the projected picture which corresponds to the film picture of the film 1 is formed by the polarized light beam L2 within a reference picture frame $W_{REF}$.

In this state, line sensors U1, U2; D1, D2 and S1, S2 provide edge detection signals $S_{U1}$, $S_{U2}$; $S_{D1}$, $S_{D2}$ and $S_{S1}$, $S_{S2}$, which are light reception outputs corresponding to projected positions of edges of the reference picture frame $W_{REF}$, to an upper edge detection circuit 43U, a lower edge detection circuit 43D and a lateral edge detection circuit 43S, respectively. The line sensors U1, U2; D1, D2, and S1, S2 are arranged at three edges of the reference picture frame $W_{REF}$, an upper edge $E_U$, a lower edge $E_D$ and a lateral edge $E_S$, and extend perpendicularly therefrom.

Figure 5:
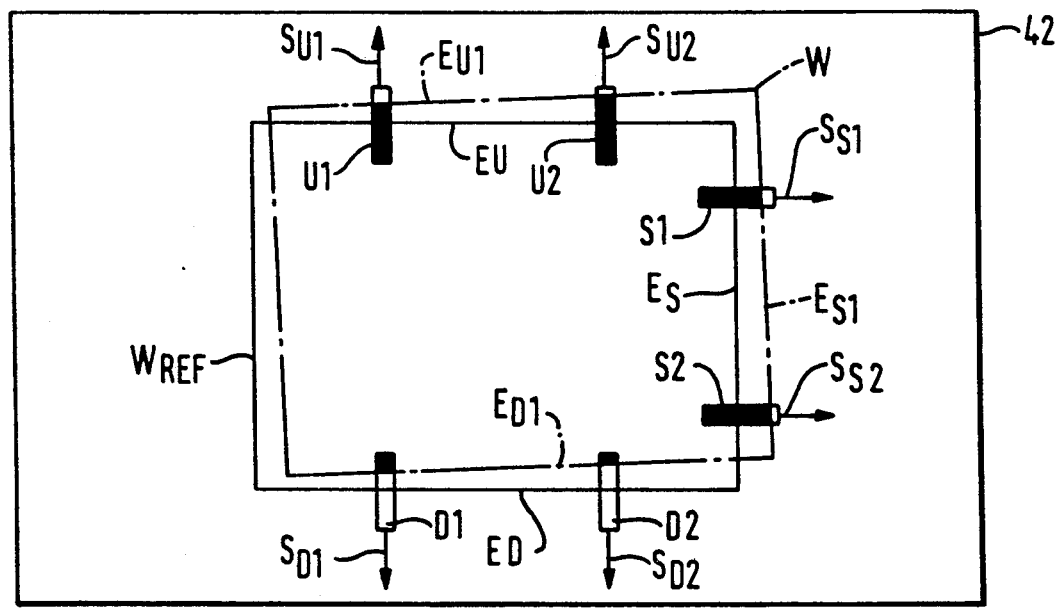
FIG. 5 shows diagrammatically how the misregistration of a frame is detected.

As shown in FIG. 5, when there is misregistration, the upper edge detection circuit 43U, the lower edge detection circuit 43D and the lateral edge detection circuit 43S detect projected positions of the projected picture on the upper edge $E_{U1}$, the lower edge lateral edge $E_{S1}$ according to output levels of the edge detection signals $S_{U1}$, $S_{U2}$; $S_{D1}$, $S_{D2}$ and $S_{S1}$, $S_{S2}$ which are supplied from the line sensors U1, U2; D1, D2 and S1, S2. The projected positions detected are supplied as edge position detection signal $S_U$, $S_D$ and $S_S$ to a misregistration amount detection/correction circuit 44.

The misregistration amount detection/correction circuit 44 performs operations on amounts of both vertical and lateral misregistration of the projected picture relative to the reference picture frame $W_{REF}$, and the angle of rotation of the picture frame W about the lower left corner of the reference picture frame $W_{REF}$ on the basis of the edge position detection signals $S_U$, $S_D$ and $S_S$ supplied from the upper edge detection circuit 43U, the lower edge detection circuit 43D and the lateral edge detection circuit 43S. Then, a correction signal $S_H$ which corresponds to each misregistration amount is supplied to the special effects device 40.

The special effects device 40 stores the video signal VD in a frame memory, and the position of the picture frame W of the projected picture which is represented by the video signal VD is corrected to remove the misregistration in dependence on the correction signal $S_H$.

Suppose that in such a system, as shown in FIG. 5, the projected picture which corresponds to the film picture is projected on the edge sensor 42 such that the projected picture is shifted to a position, indicated by the dot-and-dash line, by both parallel translation to the upper right side and counter-clockwise rotation from the position of the reference picture frame $W_{REF}$. In this case, the line sensors U1 and U2 supply edge detection signals $S_{U1}$ and $S_{U2}$, according to the position of an upper edge $E_{U1}$, to the upper edge detection circuit 13U.

In dependence on the edge detection signal $S_{U1}$, the upper edge detection circuit 43U determines the position where the upper edge $E_{U1}$ intersects the line sensor U1, and the upper edge detection circuit 43U supplies the determined position as an edge position detection signal $S_U$ to the misregistration amount detection/correction circuit 44. Moreover, the upper edge detection circuit 43U determines from a light reception output signal $S_{U2}$ a position where the upper edge $E_{U2}$ intersects the line sensor U2, and the upper edge detection circuit 43U supplies the position as an edge position detection signal $S_U$ to the misregistration amount detection/correction circuit 44.

Similarly, the lower edge detection circuit 43D and the lateral edge detection circuit 43S determine positions where the lower edge $E_{D1}$ and the lateral edge $E_{S1}$ cross the line sensors D1, D2 and S1, S2 on the basis of edge detection signals $S_{D1}$, $S_{D2}$ and $S_{S1}$, $S_{S2}$, respectively. These positions are supplied as edge position detection signals $S_D$ and $S_S$ to the misregistration amount detection/correction circuit 44.

The misregistration amount detection/correction circuit 44 performs operations on vertical and lateral parallel displacements of the picture frame W of the projected picture in relation to the reference picture frame $W_{REF}$ and the amount of rotation of the picture frame W about the lower left corner of the reference picture frame $W_{REF}$ on the basis of these position detection signals $S_U$, $S_D$ and $S_S$. Then, the calculated amounts are supplied as correction signals $S_H$ to the special effects device 40.

The special effects device 40 compensates picture data according to the correction signals $S_H$, so that the vertical and lateral parallel displacements and the rotation are cancelled thereby to return the picture frame W of the projected picture to the position to coincide with the reference picture frame $W_{REF}$. The picture data are the video signal VD stored as digital data in the frame memory.

Thus, even if a projected picture which is incident on the image pick-up device 39 is shifted from the reference picture frame $W_{REF}$, the special effects device 40 corrects the projected picture by correction signals $S_H$ to position the projected picture within the reference picture frame $W_{REF}$ thereby to output it as an output video signal $V_{DOUT}$ with exact frame positioning.

In this second embodiment, it is not possible to detect the upper edge $E_{U1}$ by the line sensors U1 and U2 when a film picture to be projected is a picture having a dark upper edge such as a night sky. The misregistration amount detection/correction circuit 44 then provides correction signals $S_H$ according to an amount of misregistration of the lower edge $E_{D1}$ which is detected by the line sensors D1 and D2.

When an image, such as of a window frame, not of the same inclination as the lateral edge, appears in a film picture to be projected, the window frame might be erroneously detected as a lateral edge $E_S$ by the lateral edge sensors S1 and S2. To avoid false detection in such a case, if the difference between the inclination of the lateral edge $E_S$, which is calculated from the inclination of the upper edge $E_U$, and the inclination of the lateral edge $E_S$ as actually detected is larger than a predetermined amount, the misregistration amount detection/correction circuit 44 controls the correction signals $S_H$ to supply the video signal VD without correcting it.

With such a construction, a shift of a projected picture can be detected as misregistration of the picture frame W of the projected picture from the reference picture frame $W_{REF}$. On the basis of the misregistration, the video signal VD is corrected and thus, a film image pick-up system having enhanced frame alignment is obtained.

In the second embodiment, misregistration of the projected picture is detected by the edge sensor 42 including six line sensors. In place of these sensors, the embodiment may use a charge coupled device 45, as shown in FIG. 6, to detect a projected position of a projected picture. The misregistration of the projected picture relative to a predetermined position may be calculated as the misregistration between the picture frame W of the projected picture and the reference picture frame $W_{REF}$ which has been previously stored.

In this case, the misregistration amount detection/correction circuit 44 judges that the detected positional information relates to the picture frame W only when charge coupled elements which detect an edge are arranged along a straight line. According to the positional information, the misregistration is corrected. The charge coupled device 45 makes it possible to perform finer detection than is generally possible with six line sensors.

In the second embodiment, the misregistration of the projected picture is detected with six line sensors. Instead of the six line sensors, dual or two-piece photosensors may be used in such a manner that the division lines thereof are positioned along the edges of the reference picture frame $W_{REF}$, and misregistration may then be detected on the basis of analogue outputs which are supplied from the dual photosensors.

In the second embodiment, the light beam L1 which has passed through the film 1 is converted to the video signal VD by the image pick-up device 39, and the video signal VD is corrected on the basis of misregistration of the projected picture detected by the edge sensor 42. An image pick-up device including a charge coupled device with a misregistration judging area at an outer peripheral area of the reference picture frame $W_{REF}$ may be used instead. The image pick-up device 39 may detect misregistration of the picture frame W from the reference picture frame $W_{REF}$ as well as convert the projected pictures of the film 1.

With such a construction, misregistration is directly determined on the image pick-up device 39, and hence detection and correction of misregistration can be carried out with high accuracy.

In the second embodiment, the projected light beam L1 is split by the beam splitter 38, but some other device such as a half-silvered mirror can be used.

In the second embodiment, two line sensors are arranged in the edge sensor 42 to correspond to each of the upper edge $E_U$, the lower edge $E_D$ and the lateral edge $E_S$, but different numbers of line sensors can be used.

Thus, misregistration of a frame produced in converting a movie film to a video signal can be detected and corrected.

Various modifications are of course possible. From example, although in the above description reference has been made to registration marks exposed or printed on the film, and to the detection of the edges of the frames, it is possible to detect some other registration feature opto-electronically. Such registration features may, for example, be the corners of the frames 3 or of the sprocket holes 4, and the detection of these registration features, like the detection of the edges of the frame described in the second embodiment, is of particular advantage in the case of pre-existing films 1 which do not have the registration marks 2.

In the case of all the embodiments there may be necessary or consequential modifications to the movie camera used to project the film 1. In the case of the first embodiment the camera may be modified to produce the registration marks 2 on the film 1 in the required positions relative to each frame 3 at the time that the film 1 is exposed in the camera, so as to be transferred to a subsequent copy of the film 1 which is to be used for conversion to a video signal.

In the case of the second embodiment, where no registration marks are provided on the film 1, and registration is achieved by reference to the frames 3 themselves, it is to be noted that the film sprocket holes 4 are no longer essential. This means that a form of movie camera can be used which operates with plain film having no sprocket holes, and which has a mechanism, not relying on sprocket holes, to advance the film by a substantially constant distance for the exposure of each frame 3. Such a movie camera can be made quieter in operation than a movie camera of known form, wherein the film advance mechanism makes use of sprocket holes in the film 1.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of forming a video signal having a plurality of pixels representing a video image from a film having a plurality of frames with respective registration features associated therewith, said method comprising the steps of:

generating said video signal from said film on a frame by frame basis;

providing fixed reference features in a CCD detector;

detecting misalignment between the respective registration features associated with each of said frames and reference features;

deriving error signals in accordance with the detected misalignment between the respective registration features and the reference features; and processing said video signal in accordance with said error signals so as to produce a corrected video signal in which said image has been manipulated by rotating said image.

2. A method according to claim 1, wherein said film includes a plurality of sprocket holes having respective edges associated therewith and wherein said registration features include said edges of said sprocket holes.

3. A method according to claim 1, wherein:

each of said frames has respective edges associated with said frame; and said registration features include said edges of said frames.

4. A method according to claim 1, wherein said image has been manipulated by moving said image in at least one of a horizontal direction and a vertical direction.

5. A method according to claim 1, wherein said registration features comprise registration marks that include a line extending in a substantially horizontal direction and a line extending in a substantially vertical direction.

6. A method according to claim 5, wherein two of said registration marks are associated with each of said frames of said film and wherein the two marks are respectively positioned so as to be adjacent to diagonally opposite corners of the respective frame.

7. Apparatus for forming a video signal having a plurality of pixels representing a video image from a film having a plurality of frames, said apparatus comprising:

film to video conversion means for generating said video signal from said film on a frame by frame basis;

detection means having CCD sensor with fixed reference features therein for detecting misalignment between at least one respective registration feature associated with each of said frames and reference features and for generating error signals in accordance with said misalignment; and digital video effects means for processing said video signal in accordance with said error signals so as to produce a corrected video signal in which said image has been manipulated by rotating said image.

8. Apparatus according to claim 7, wherein said detection means includes means for determining each respective position of the at least one respective registration feature associated with each of said frames of said film and for comparing each of the respective positions with the positions of said reference features so as to generate said error signals, said error signals representing the respective positional misalignment of the frame being viewed from a correctly aligned frame position, and wherein said detection means further includes means for supplying said error signals to said digital video effects means for processing said video signal.

9. Apparatus according to claim 8, wherein said means for determining and comparing includes charge coupled device means for forming an image of said registration features.

10. Apparatus according to claim 7, wherein said film to video signal conversion means includes telecine means.

11. Apparatus according to claim 7, wherein said video signal is recorded with a camera having means for forming each said registration feature associated with each of said frames by exposing said film.

12. Apparatus according to claim 7, wherein said film includes a plurality of sprocket holes having respective edges associated therewith and wherein the registration features of said frames include said edges of said sprocket holes.

13. Apparatus according to claim 7, wherein:
each of said frames has respective edges associated with said frame; and
the registration features of said frames include said edges of said frames.

14. Apparatus according to claim 13, wherein said detection means comprises a plurality of line sensors for detecting positions of said edges of said frames, at least two of said sensors being arranged to cross one of said edges at respective locations spaced along said one edge.

15. Apparatus according to claim 14, wherein said detection means comprises three pairs of line sensors, each of said pairs of line sensors being arranged to sense a position of a respective one of said edges.

* * * * *